United States Patent [19]
Cooper

[11] 3,787,809
[45] Jan. 22, 1974

[54] SYSTEM FOR DERIVING AZIMUTH STEERING COMMANDS FROM AUTOMATIC DIRECTION FINDING EQUIPMENT

[75] Inventor: Philip G. Cooper, Saratoga, Calif.

[73] Assignee: Kaiser Aerospace & Electronics Corporation, Oakland, Calif.

[22] Filed: Sept. 22, 1971

[21] Appl. No.: 182,735

[52] U.S. Cl...... 343/117 R, 235/150.26, 343/112 C
[51] Int. Cl.............................................. G01s 3/42
[58] Field of Search. 343/117 R, 112 C; 235/150.26

[56] References Cited
UNITED STATES PATENTS

| | | | |
|---|---|---|---|
| 2,384,004 | 9/1945 | Bechberger et al............. | 343/117 R |
| 2,482,809 | 9/1949 | Thompson .................. | 343/117 R X |
| 2,585,164 | 2/1952 | Perkins, Sr...................... | 343/117 R |

Primary Examiner—Maynard R. Wilbur
Assistant Examiner—Richard E. Berger
Attorney, Agent, or Firm—Johnson, Dienner, Emrich, Verbeck and Wagner

[57] ABSTRACT

An airborne navigation system for deriving azimuth steering commands from automatic direction finding equipment which includes a receiver for selecting a commercial broadcast station, a selector dial for selecting a desired course or azimuth to such broadcast station, and circuitry for providing a left-right deviation signal which enables the pilot to fly the aircraft along the selected course line (azimuth). Associated circuitry provides signals which indicate whether the aircraft is approaching toward or departing from a station, whether the aircraft is over the selected broadcast station, and whether the selected broadcast station has a predetermined relative bearing, which signals are used to provide a more reliable display of azimuth steering commands.

18 Claims, 6 Drawing Figures

INVENTOR
PHILIP G. COOPER

SYSTEM FOR DERIVING AZIMUTH STEERING COMMANDS FROM AUTOMATIC DIRECTION FINDING EQUIPMENT

BACKGROUND OF THE INVENTION

1. Field of the Invention

An airborne navigation system which uses automatic direction finding equipment to derive azimuth steering commands for a selected course to a broadcasting station.

2. Description of the Prior Art

In the early days of aviation there were a number of areas in which the provision of closely spaced radio networks (such as VOR) was impractical and over-costly, and in such areas it was customary for the pilot to use either compass and dead reckoning techniques or airborne direction finder equipment in navigating from point to point. In the use of airborne direction finders, the pilot tuned his receiver to a known commercial broadcasting station, and the directional characteristics of the antenna attached to the radio receiver were such that it was possible to tell the direction of the selected broadcasting station from the aircraft. Thus, with an accurate map which identified the location of the conventional radio broadcasting stations (as well as the military stations) a pilot could navigate cross country by selecting a series of stations along the route to be travelled. As each such station was reached in the flight, a further broadcasting station which lay along the desired route was selected, and flight proceeded toward such further station.

As the aircraft industry developed, automatic direction finding systems were produced which would automatically track the selected station and display the azimuth of the station relative to aircraft heading. While such systems were helpful to the pilot, the routes established by such equipment consisted of a straight line from the aircraft position to the selected station. It is readily apparent that it is not always possible to fly a direct route (as for example, areas having congested traffic patterns, in mountainous terrain, in areas having inclement weather, etc.), and in such environments other methods of navigation must necessarily be employed.

In some areas of the world, and particularly in the continental United States, a more advanced form of radio aid has been developed which is known in the field as a VHF omni-directional radio range system (VOR). VOR was primarily developed for the reason that ADF navigation was limited to straight line routes between stations. In high density traffic areas, for example, where the need for unrestricted angular guidance was paramount for reasons of safety (separation), the ADF systems were simply not satisfactory.

In a VOR system, instead of giving aircraft guidance from the existing position of the aircraft along a straight line route to the broadcasting station (as in ADF), the system permits selection by the pilot of a desired azimuth (or radial) to a selected omni station in the system. Such mode of operation is basically achieved by comparing the phase of two low frequency modulations of a VHF carrier provided by the selected omni station. One modulation signal is the reference signal, and its phase is not dependent upon the bearing of the aircraft relative to the transmitting station. The other modulation signal is of the same frequency, but has a phase delay compared to the reference which is equal to the bearing of the aircraft relative to true north. The airborne omni equipment then utilizes such signals to solve for the left-right deviation signal which guides the pilot along the selected course. The signal output provided by the aircraft receiver to the pilot comprises a proportional "left-right" signal which indicates deviation of the aircraft relative to the selected course or radial.

VOR, while extensively used in the United States, is limited in terms of range from the broadcasting station to approximately line-of-sight distances (i.e., 130 miles at 12,000 feet altitude). Thus, to provide uninterrupted coverage in a given area for unrestricted angular enroute navigation, broadcasting stations have to be spaced a maximum of 260 miles apart for aircraft operating at 12,000 feet altitude. In high density traffic areas, where close spacing demands high accuracy (approximately 3 percent overall for VOR) the expense is perhaps justified. In areas where the economic resources are not available, or high density is not a factor, a need exists for a navigational system which has the angular capability of VOR, while yet being of a lower cost than such equipment.

SUMMARY

It is an object of the present invention to provide a novel system which includes ADF receiver means for selecting a commercial broadcast station, selector means for selecting a desired azimuth of such broadcast station, and signal response means for providing the left-right deviation from the selected course to the broadcasting station.

It is a further object of the invention to provide an ADF system of such type in which the derived left-right signal is applied to a flight director autopilot, or automatic flight control systems, to provide a display of the computed steering command to the pilot or the autopilot servos.

Such system basically comprises an ADF receiver having dial means which permits the pilot to select a commercial broadcast station, and means for providing a signal which represents the relative bearing $\alpha$ to the broadcast station. Compass system means provide a signal $\psi$ which represents the magnetic heading of the aircraft, and adjustable course select means, which provide a signal $\gamma$ representative of the selected course, are operable with the compass system means to provide a signal $\epsilon$ which is proportional to the course error of the aircraft relative to the selected course. Differencing means combine the signals $\alpha$ and $\epsilon$ to provide the left-right deviation signal $X$ which guide the pilot along the selected course (or radial) to the broadcast station.

According to a further feature of the invention, to-from means connected to the output of the ADF receiver generate a signal which indicates to the system whenever the aircraft is approaching the selected station or departing from such station (which means detect the angle that the ADF bearing vector makes with the longitudinal axis of the aircraft as acute (TO) or obtuse (FROM)) and additional means modify the polarity of the input to the differencing means ($\alpha$ and $\epsilon$) in accordance with the prevailing detected condition.

Over Station detection means are also responsive to the signal output of the ADF receiver to determine whenever the aircraft is approaching near or is over the station, and display means are operated by such detection means to provide a corresponding signal to the pilot of such condition.

A further station bearing circuit is operative to detect the condition in which the relative bearing to the selected broadcast station is 85° – 95°, and circuit means responsive to the detection of such condition block the signal $\epsilon$ from the differencing means, which results in the condition $\alpha = X$, and the pilot is in effect instructed to fly toward the station in a conventional ADF mode. As soon as the pilot maneuvers to so do, the relative bearing will change to <85° or <95°, and the circuit means will remove the block for the $\epsilon$ input.

GENERAL DESCRIPTION

Preliminary to the description of the novel circuit which provides directions for a pilot to a selected radial of a selected broadcast station, there is set forth hereat certain representative flight conditions, and the information which is used in generation of the flight commands for such conditions.

As noted above, the novel system includes a standard ADF receiver unit which includes tuning means for selecting any of the commercial or standard broadcast stations. In addition, the system includes a dial for selecting a desired radial or "selected course" to the broadcast station. With the operation of the dial to select a desired course, the system automatically provides an output signal which, as displayed on a meter, indicates left-right deviation from the path which is to be followed to approach the broadcast station along the desired radial. With such display, the pilot need only maneuver the aircraft so that the meter continually indicates an on-course condition to effect advance along the selected course line. Alternatively, such signal is applied to the aircraft autopilot system, and the aircraft is automatically guided along such selected course to the selected broadcast station.

Figure 1:
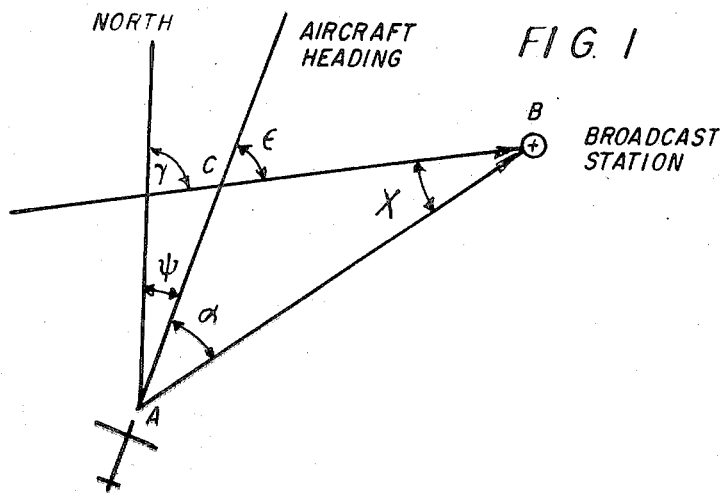
FIGS. 1 and 2 are illustrative of the geometric relation which exists between the aircraft and the broadcast station in two representative conditions of flight.

With reference to FIG. 1, the geometric relation of an aircraft and a broadcast station for a representative flight condition is set forth thereat. With the direction NORTH shown as indicated, the aircraft will be seen to be flying a compass course or magnetic heading of 18° (i.e., along line AC). A signal representative of aircraft heading information, designated $\psi$, is provided by the aircraft compass system. The broadcast station B (which will be assumed to be the station selected by the ADF in the present example) is shown to have a relative bearing of 35° from the aircraft (i.e., the angle between the magnetic heading of the aircraft (line AC) and the relative bearing of the broadcast station (line AB). The angle CAB is designated $\alpha$. As will be shown, a signal proportional to the value of angle $\alpha$ is provided at the output of the ADF receiver for use in determining the selected course to the broadcast station, and the signal representing cosine $\alpha$ is derived for use in determining certain geometric relationships between the aircraft and the broadcast station. In FIG. 1, the selected course is represented by the line CB, which course has an angle relative to true NORTH designated $\gamma$, and an angle relative to the aircraft heading designated $\epsilon$.

The angle between the selected course CB and the aircraft bearing to the station is designated X, and as will be shown, by determining the value of X and maneuvering the aircraft so that the value of X is zero, the aircraft will follow the selected course line.

More specifically with reference to FIG. 1 it will be seen that $\epsilon = \gamma - \omega$.

Further, since the sum of the interior angles of a triangle equals 180°, $$X + \alpha + (\angle ACB) = 180°$$

$$\text{and } \angle ACB = 180° - \epsilon$$

By substitution $$X + \alpha + (180° - \epsilon) = 180°$$

$$X = (\epsilon - \alpha)$$

Thus the left-right deviation from the selected course is equal to the difference of the course error ($\epsilon$) and the relative bearing of the broadcast station from the aircraft ($\alpha$). As will be shown, the novel circuitry is operable to determine the difference of the value of $\epsilon$ and $\alpha$ (i.e., X) and such signal (X) provides the direction which enables the pilot to fly the selected course of azimuth to the broadcast station.

Figure 2:
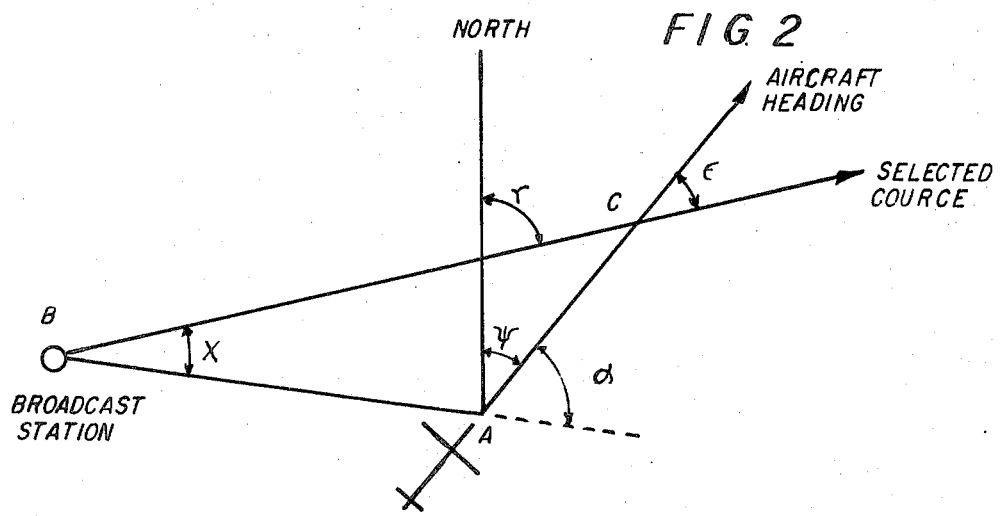
Figure 3:
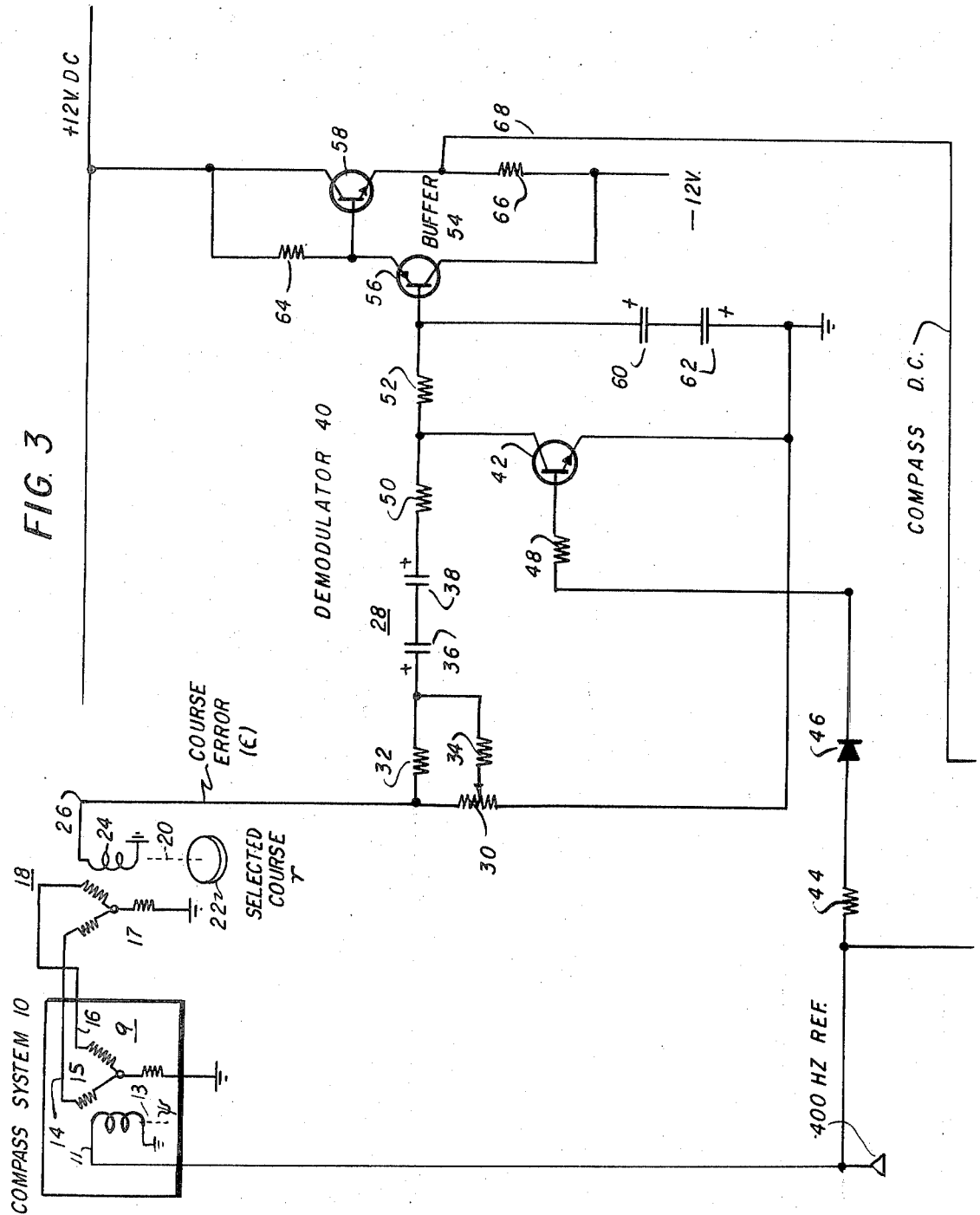
FIGS. 3–6 as viewed together provide a detailed schematic showing of the novel navigation circuit of the invention.

In the illustration of FIG. 1, the aircraft is shown as heading toward (TO) the selected station. With reference to FIG. 2 there is shown thereat a representative condition in which the aircraft is departing from a station (FROM). A fundamental difference between the TO-FROM condition is evidenced by the fact that the angle which the ADF bearing vector AB makes with the longitudinal axis AC of the aircraft in the TO condition (FIG. 1) is acute, and in the FROM condition (FIG. 2) is obtuse.

Using the theory used for the relationship shown on FIG. 1, the sum of the interior angles of a triangle equals 180° and $$X + \epsilon + \angle CAB = 180°$$

$$\angle CAB = 180° - (\alpha)$$

$$X + \epsilon - \alpha = 0$$

$$X = \alpha - \epsilon$$

Thus the only difference between the equation for X in FIG. 1 and FIG. 2 is that the polarity has changed. As will be shown, the novel circuitry detects the TO, FROM conditions by determining whether the angle between the ADF bearing vector and the longitudinal axis of the aircraft is acute or obtuse, and provides corresponding adjustments to the circuit.

In the foregoing discussion and the circuit arrangement set forth hereinafter, the following definitions are in point.

1. X is the acute angle from the ADF bearing vector to the selected course vector, and is positive going clockwise, and negative counter-clockwise.
2. There are two definitions required for $\alpha$; namely, TO (going towards the station) and FROM (going from the station).
   a. TO : $\alpha$ is the acute angle between the ADF bearing vector and the aircraft heading vector, with clockwise rotation from the heading vector to the bearing vector being positive, and counter-clockwise being negative. (See FIG. 1)

b. FROM: α is the acute angle between the ADF bearing vector and the aircraft heading vector, with clockwise rotation from the inverse bearing vector to the heading vector being positive, and counterclockwise being negative. (See FIG. 2)

c. ε is the acute angle between the heading vector and the Selected Course vector, with clockwise rotation from the heading vector to the course vector being positive, and counterclockwise being negative.

SPECIFIC DESCRIPTION

With reference to FIGS. 3-6, the novel circuit arrangement for using ADF equipment to derive and generate azimuth steering commands is set forth in more detail thereat.

Compass System

As noted above, the navigation system includes a compass system 10 for providing a signal output which indicates the magnetic heading ω of the aircraft. Compass system 10, as shown, comprises a remote indicating compass which includes a servo synchro transmitter 9 having an input winding 11 which is rotatable through 360° by shaft 13 which in turn rotates in accordance with the output of the aircraft compass. Thus, the positions of the shaft 13 and winding 11 are continually determined by the magnetic heading of the aircraft at any given time. Winding 11 is connected to be energized by the 400 cycle output of source 12. Thus with the change of aircraft heading and the resultant change of aircraft heading by the aircraft compass, the changing position of the shaft 13 and winding 11 results in a corresponding change in the amplitude of the 400 cycle input signal. The variable amplitude 400 cycle signal provided by winding 11 is fed to the three legged winding 15 of the synchro transmitter 9, which windings are connected over conductors 14, 16 and ground to the three legged winding 17 of a synchro receiver 18.

A dial 22, which is calibrated from 0°–360° to represent the course to be selected by the pilot to a broadcast station, is mounted on a shaft 20, which shaft is adjustable through 360° with the dial 22. A secondary winding 24 of receiver 18 mounted on shaft 20 is initiated by the shaft 20 to different positions as the pilot adjusts dial 22 to select a course, and the amplitude of the AC signal output from the windings 17 is correspondingly varied. That is, winding 24 is connected to subtract a signal ν (the value of which is determined by the setting of dial 22) from the signal ω provided by winding 17 (i.e., the signal ν which represents the selected course is subtracted from the signal ω which represents the aircraft magnetic heading. The resultant signal is designated the course-error signal ε, or a signal which represents the difference angle of ν − ω. The phase of the resultant output signal is determined by the position of the selected course vector relative to the heading vector. That is, if the selected course vector is rotated clockwise from the heading vector, signal ε is a positive value (in-phase with the reference signal). If the selected course vector is rotated counterclockwise from the selected course vector, then the signal ε is a negative value (i.e., 180° out of phase relative to the 400 cycle reference signal).

By way of brief example, with the aircraft in the condition shown in FIG. 1, and assuming that the pilot has tuned his ADF receiver 80 (FIG. 4—to be described) to the broadcast station B (shown in FIG. 1), that the pilot has elected to approach the broadcast station along the 80° radial course (line BC), and that the magnetic heading of the aircraft is 28°, the adjustment of the dial 22 to read 80° will result in the provision of a difference signal ε = ν − ω, or a value which represents 80° − 28° = 52°. Since the selected course vector in this example is rotated clockwise from the heading vector, signal ε will be a positive value, and the output signal will be in phase with the reference signal provided by source 12.

Signal ε output over conductor 26 from the compass system is fed to the input circuit 28 for demodulator circuit 40. Input circuit 28 basically comprises a resistor 32 and coupling capacitors 36, 38, with adjustable resistor 30 and resistor 34 being connected across resistor 32 for calibration purposes.

Demodulator 40 includes an NPN transistor 42 which is connected to switch on and off every half cycle of the 400 Hz reference signal provided by source 12 over resistance 44, diode 46 and resistance 48 to the base thereof. Transistor 42 will conduct during each positive half cycle of the input 400 Hz reference signal, and at its collector will clamp the signal ε (which is input over path 28, resistor 32, capacitors 36, 38, and resistor 50) to ground. During each negative half cycle of the 400 Hz reference voltage transistor 42 is cut off and the signal ε is fed over resistor 52, filtered by capacitors 60, 62, and fed to buffer circuit 54.

It is apparent that if signal ε is positive (in phase with the reference signal because the course vector is rotated clockwise with respect to the heading vector) the output signal to the buffer circuit 54 will be negative, and if the signal ε is negative (out of phase with the reference signal) the ε signal input to the buffer circuit 54 will be positive.

Figure 4:
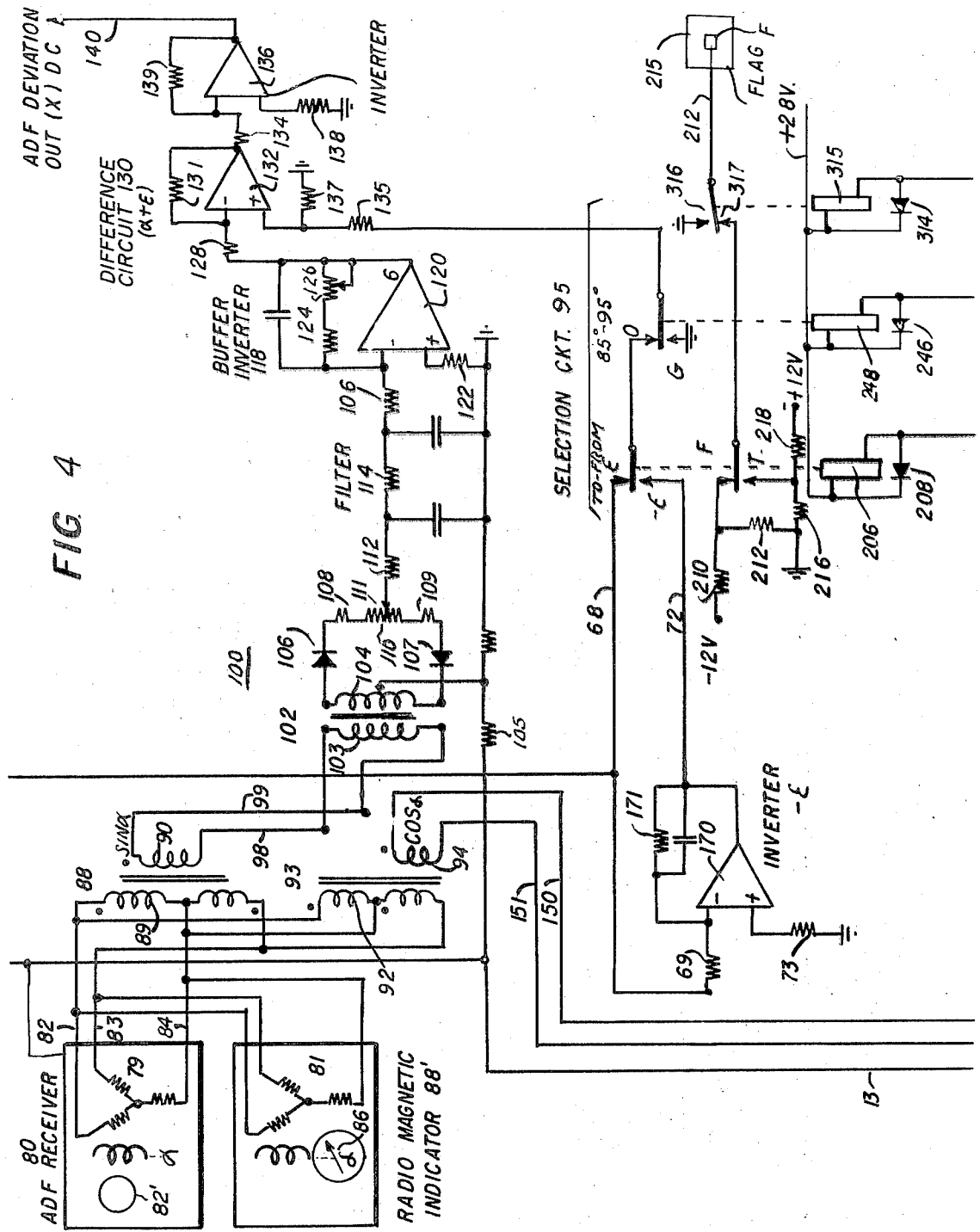

Buffer circuit includes a first transistor 56 connected as an emitter-follower, with its collector connected to −12 volt battery, its base connected to receive the signal ε over resistor 52, and its emitter connected over resistor 64 to +12 volts DC and to the base of a second transistor 58 in buffer 54. The second transistor 58 is also connected as an emitter follower with its collector connected to +12 volts battery, and its emitter connected over resistor 66 to −12 volts DC, and over path 68 to selection circuit 95 (FIG. 4). The manner in which the DC polarity signal ε is combined with the α signal to provide deviation signal X is set forth hereinafter.

ADF Receiver

With reference now to FIG. 4, an ADF receiver 80, which may be of the type conventionally used on aircraft in the field, is shown thereat. In operation, tuning dial 82' on ADF receiver 80 is tuned to a desired broadcast station, such as Station B (FIG. 1), and the receiver responsively provides a signal output α which is an amplitude modulated phase variable 400 cycle signal, which signal represents the bearing of the selected broadcast station relative to the aircraft magnetic heading. The output of the ADF receiver is fed by a three wire synchro transmitter 79 over three conductors 82, 83, 84, to (a) a radio magnetic indicator 88', (b) to a center-tapped primary winding 89 of a transformer 88, and (c) a center-tapped primary winding 92 of a transformer 93.

Radio magnetic indicator 88' includes a meter 86 having a needle 87 which rotates through 360°, and which is operative in response to the α signal input on conductors 82, 83, 84 to rotate to the position which indicates the relative bearing of the station selected by the tuning dial 82' on the ADF receiver 80.

The signal output which appears at the secondary 90 of transformer 88 will, by reason of the polarities of primary winding 89, comprise a sine α signal. It can be shown that for small angles the relationship sine α = α will be valid. The signal output over secondary winding 94 of transformer 93, however, will by reason of the illustrated polarities of the primary winding 93, be a cosine α signal. Such signal, as will be shown, is used within the novel circuit to determine (a) whether the angle between the ADF bearing vector and the longitudinal axis of the aircraft is acute or obtuse, (b) whether the aircraft is over the selected station, and (c) whether the selected station bearing is within the range of 85° – 95°.

The sine α signal output of secondary winding 90 on transformer 88 is fed over conductors 98, 99 to the primary winding 103 of a transformer 102 in phase sensitive detector 100. The secondary winding 104 of the transformer 102 is center-tapped, the center tap being connected over resistor 105 to the 400 Hz data reference source. The end terminals of winding 104 are connected over oppositely-poled rectifiers 106, 107 and series resistors 108, 110, 109. Adjustable tap 111 on resistor 110 derives the sine α signal from the detector circuit 100.

The amplitude of the voltage signal output over transformer 102 is proportional to the value of the sine α signal. If the relative bearing of the selected station is in the 0°-180° segment relative to the aircraft, sine α is out of phase with the 400 Hz reference signal. Alternatively, if the angle α is in the 180° – 360° segment, then sine α is in phase with the 400 Hz reference signal.

In the event that sine α is zero, then the 400 Hz signal input over center tap to the secondary 104 of transformer 102 will balance out on alternate half cycles, and the signal output at the adjustable tap 111 will be zero (i.e., no output). If the sine α signal applied to the primary winding 103 of transformer 102 is in phase with the reference signal input to the center tap, the sine α signal will be added to the reference signal voltage at the tap 111, and sine α will be a DC signal of positive polarity over output resistor 112. This will correspond with values of sine α for angles in the 180°-360° segment. If the sine α signal is 180° out of phase with the reference voltage, the value of the sine α signal will be subtracted from the reference voltage to provide a DC signal output of negative polarity over output resistor 112. This will correspond with values of sine α for angles in the 180°-360° segment.

It will be apparent therefore that the output of the phase at the tap 111 will be either a positive or a negative DC signal having a value which varies with the value of the angle (i.e., the angle between the axis of the aircraft and the bearing of the selected station), and a polarity which varies with the segment in which the bearing of the station occurs.

It will be recalled that the relationship sine α = α can be shown to be valid for small values of α. Further sine α for angles between 0° and 180° is positive and therefore by the relationship sine α = α, α is positive. Conversely sine α for angles between 180° and 360° is negative, and α is therefore negative. When these relationships are combined with the description of the relationship between the phase of the 400 Hz signal and the DC signal polarity from the detector 100 it can be seen that positive values of α are represented by negative DC voltages and vice versa.

The DC polarity signal α is applied over resistor 112, to the bi-polar filter 114 and over resistance 116 to the buffer and inverter circuit 118.

The buffer inverter circuit 118 basically comprises an operational amplifier 120 which may be of the type commercially available from Fairchild Camera and Instrument Corporation, Mountain View, Calif. as a 741 operational amplifier which includes an inverting input terminal connected to the output of filter 114 and a non-inverting input terminal connected over resistance 122 to ground. The output of amplifier 120 is connected over an RC feedback circuit 124, having a gain control resistor 126 connected therein, back to its inverting terminal. The output of the buffer and inverter circuit 118 is connected over resistance 128 to one input of the difference circuit 130.

Difference Circuit

As shown in FIG. 4, the operational amplifier 130 in difference circuit 130 differences the signals α received over the buffer circuit 118, and the ε signal received over selector circuit 95 to provide the desired output signal X. More specifically, difference circuit 130 includes an operational amp 132 (Fairchild 741) having its inverting input connected over resistance 128 to accept the α signal input from the buffer inverter circuit 118, and its non-inverting input connected over resistance 137 to ground and over resistance 135 and contacts 0, to receive the ε signal input over path 68 from the demodulator circuit 40 (FIG. 3) (or alternatively the −ε signal input provided by inverter 170 over conductor 72 and contact −ε).

That is, the course error signal ε provided by demodulator 40 and fed over conductor 68 to the operational amplifier 132, is also fed over resistance 69 to an inverter 170 which provides a − ε signal over path 72. Inverter 170 may comprise an operational amplifier (Fairchild 741) having an RC feedback circuit 171 connected from its output back to its inverting input terminal, and a non-inverting input terminal connected over resistance 73 to ground.

The signals ε or −ε which appear on conductors 68, 72 respectively are fed to the operational amplifier 132, as will be shown, in accordance with the relative position of the aircraft to the selected broadcast station. That is, if the aircraft is heading towards the station (TO), the selection circuit 95 will effect connection of the ε signal on conductor 68 to the operational amplifier 132, and whenever the selection circuit 95 ascertains that the aircraft is heading away from the station (FROM) the selection circuit connects the signal − ε to the operational amplifier 132.

Operational amplifier 132 is operative to difference the value of the signals α and ε (or − ε) and the resultant signal is fed over resistor 134 to the inverting input of the operational amplifier 136 (Fairchild 741) which is connected as an inverter, and the output circuit 140. As has been noted heretofore, the ADF deviation output signal X which is sought (i.e., the left-right deviation signal) is $X = \epsilon - \alpha$. The signal output $X$ over conductor 140 therefore provides the pilot with an indication of left-right deviation from the path to be flown in order to fly to a broadcast station on the selected azimuth.

Aircraft Position Indicating Circuits

As was noted heretofore, the system includes means for ascertaining and indicating whether the aircraft is headed towards a station or away from the station (TO-FROM). The novel system is further operative to ascertain and indicate whether the bearing to the station is in the approximate range of 85° – 95° to eliminate any possible ambiguous outputs.

Figure 5:
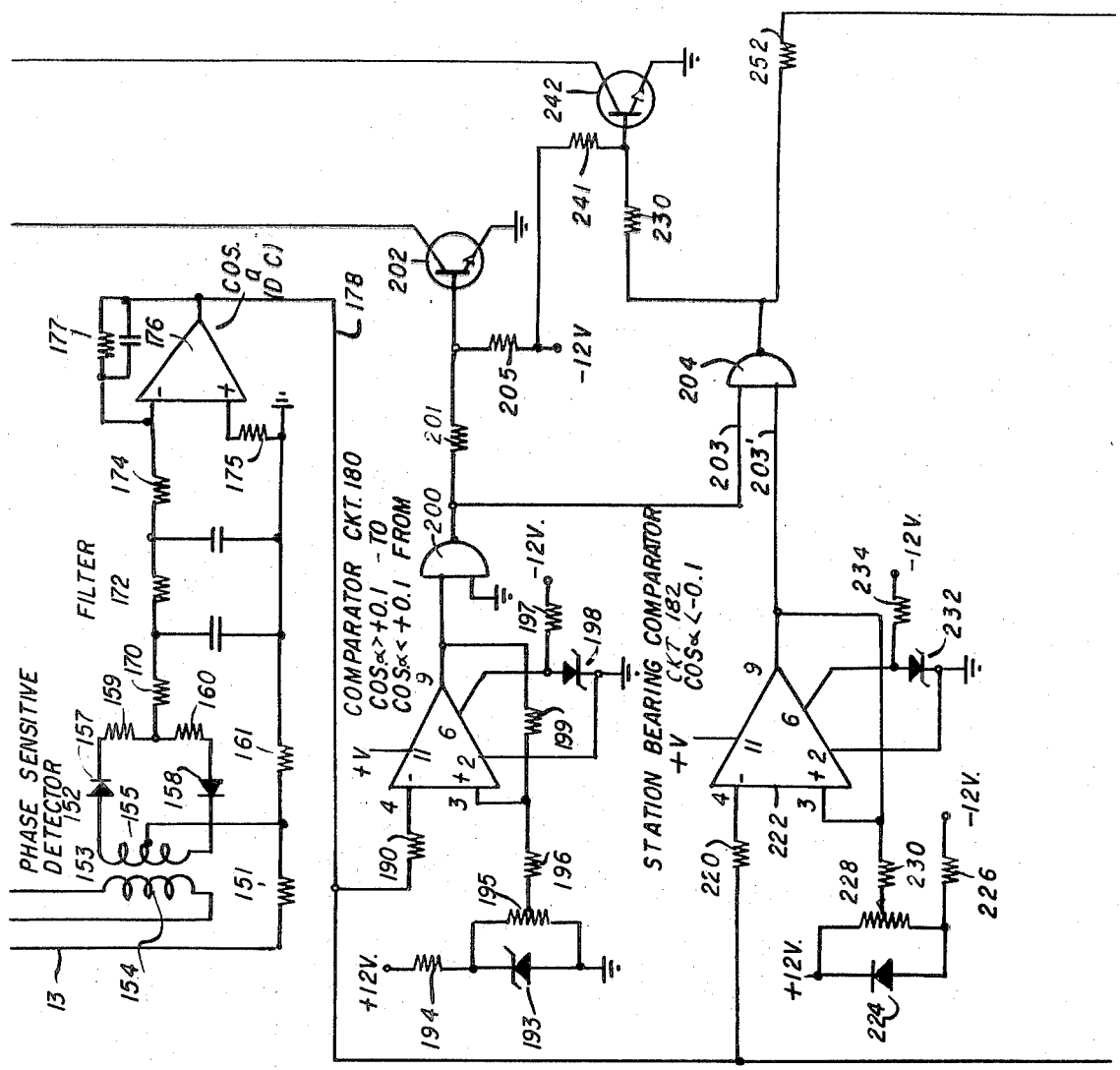
Figure 6:
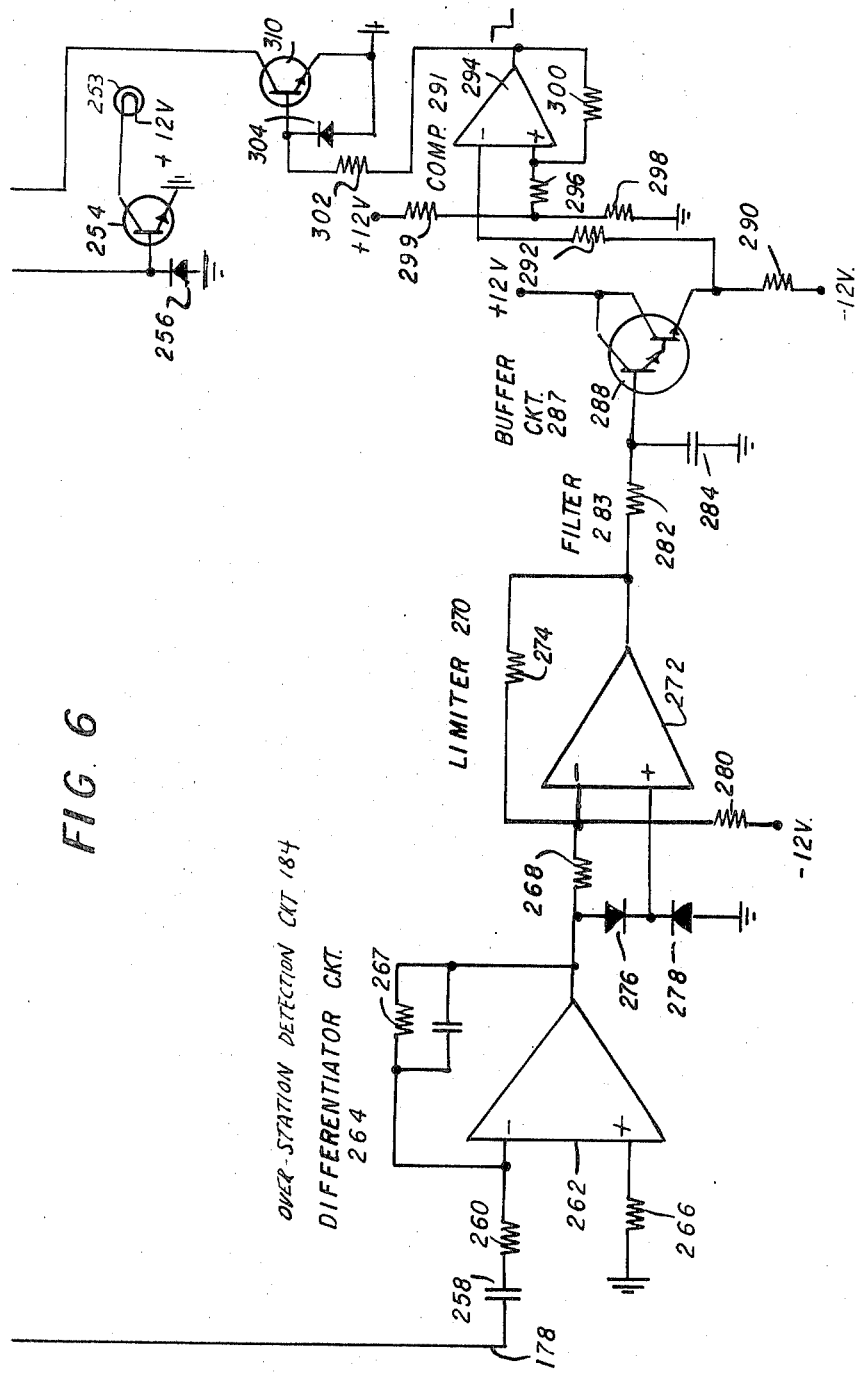

With reference to FIG. 4, the cosine α output of the secondary winding 94 of transformer 93 is fed over path 150, 151 to the input of the phase sensitive detector circuit 152 (FIG. 5). Phase sensitive detector circuit 152 is similar to circuit 100 (FIG. 4) and includes a transformer 153 having a primary winding 154, and a center tapped secondary winding 155. A 400 Hz reference signal is fed over resistor 151 to the center tap of the secondary winding 155, and the output of transformer secondary 155 is fed over oppositely poled diodes 157, 158 which are series connected with resistances 159, 160 across secondary winding 155. The junction of resistors 159, 160 is connected over resistor 170 to the bi-polar filter 172. The output signal of phase sensitive detector 152 comprises a DC polarity signal determined by the phase and amplitude of the cosine α signal. That is, as is the case of the sine α signal, the phase of the cosine α signal input to the phase sensitive detector circuit 152 will determine the polarity of the signal output over filter 172, and the amplitude of such signal will vary with the amplitude of the cosine α signal. It should be noted that the cosine α signal differs from the sine α signal in that the cosine α signal output will be positive when the angle α lies between the −90° and +90° segment, and will be negative when the angle lies in the +90 to the −90 segment.

The resultant DC polarity signal output from the phase sensitive detector 152 is smoothed by filter 172 and fed over resistance 174 to operational amplifier 176 (Fairchild 741) which is connected as a buffer circuit. A feedback circuit 177 is connected from the output of the operational amplifier 176 to the inverting terminal thereof, and the non-inverting terminal of amplifier 176 is connected over resistance 178 to ground. The DC polarity signal output from buffer 176 is fed over conductor 178 (a) to TO-FROM comparator circuit 180, (b) Station Bearing Comparator Circuit 182, and (c) Over-Station Detection Circuit 184.

To-From Detection Circuit

With reference to the TO-FROM comparator circuit 180, it is seen that the DC polarity signal representing cosine α is input over resistor 190 to the inverting input terminal 4 of comparator circuit 192 (Fairchild 710). The non-inverting terminal 3 of the comparator circuit 192 is connected to a reference circuit which includes a Zener diode 193 connected in series with resistance 194 between +12 volts and ground to provide a fixed value voltage signal across an adjustable resistor 195. The output signal picked off by the adjustable arm on resistor 195 is fed over resistor 196 to the positive input terminal of comparator 192. Such signal, for purposes of the present example, will be assumed to be in the order of +0.1 volts. Terminal 2 of comparator 710 is connected to ground, terminal 6 is connected over resistance 197 to −12 volts and over Zener diode 198 to ground, and terminal 11 is connected to + v.

The cosine α signal input to terminal 4 of the comparator circuit 192 is compared with the +0.1 volt reference signal input to terminal 3 of comparator circuit 197. Whenever the cosine α signal input over conductor 178 is greater than +0.1 volts (TO condition), the output of the comparator 192 will be low, and whenever the value of the cosine α signal is less than +0.1 volts then the output of the comparator 192 will be high (FROM condition).

The outputs of comparator circuit 192 are fed to one input of an inverter circuit 200, which has a second input connected to ground, and the output of inverter 200 is fed over resistance 201 to the base of transistor 202, and also over path 203 to one input of gate 204 for a purpose to be later described.

Transistor 202 has its emitter circuit connected to ground, its base circuit connected over resistance 205 to −12 volts potential (and the input signal from TO-FROM comparator circuit 200) and its collector connected over relay 206 to +28 volts. Diode 208 is connected across the relay coil 206 for transient suppression purposes. Relay 206 has a first set of contacts ε, −ε, and a second set of contacts F, T.

Whenever the TO-FROM comparator circuit 180 determines from the cosine α signal input over conductor 178 from the phase sensitive detector circuit 152 that the aircraft is going from the station, the output of inverter 200 will be low and the NPN transistor 202 is cut off. As a result, relay 206 is restored and at its contacts F connects a −3 volt signal (provided by divider 210, 212 connected between −12v. and ground) over contacts 317 and conductor 212 to a flag display unit 215 for the pilot.

Digressing briefly, the flag display unit 215 may comprise a solenoid-operated unit which operates a flag F to each of three positions. That is, the flag F is mounted on a vertical shaft which normally assures a center position whenever 0 volts is input to the unit (i.e., the aircraft is over the station). A first solenoid (not shown) located at the lower end of the shaft operates the flag to the lower position to indicate a FROM condition whenever a −3 volt signal is received over conductor 12, and a second solenoid (not shown) located at the upper end of the shaft operates the flag to the upper position whenever a +3 volt signal is received to indicate that the aircraft is going towards the station.

The operation of the TO-FROM comparator circuit 180 in response to a cosine α signal which indicates a FROM condition, as described above, results in cutoff of transistor 202 and a −3 volt signal over conductor 317 to the flag display unit 215 whereby flag F is operated to its lower display position.

Whenever the value of the cosine α signal input over conductor 178 to comparator circuit 180 indicates the aircraft is going towards the station (TO), the signal output from gate 200 will be high, and transistor 202 will conduct to complete an energizing circuit for relay 206. Relay 206 operates and at its contacts closes contacts T to connect a +3 volt potential provided by voltage divider 216, 218 over contacts T, contacts 317, and conductor 212 to flag unit 215. The flag F is thereupon operated to its upper display position to indicate a TO condition.

The manner in which the flag F is moved to its center display position to indicate an over-station condition is described hereinafter.

Station Bearing Comparator Circuit

As was noted above, a station bearing comparator circuit 182 is provided to ascertain whenever the bearing to the selected station from the aircraft is in the range of 85° – 95°. With the detection of such condition, the station bearing comparator circuit 182 is operative to cancel the $\epsilon$, $-\epsilon$ signal input to the difference circuit 130, whereby the output signal will be $X = \alpha$, and the pilot is in effect directed to turn the aircraft towards the broadcast station. As such turn occurs, the angle $\alpha$ will either become greater than 95° or less than 85°, and the station bearing comparator circuit will reenable the input $\epsilon$, $-\epsilon$ to the difference circuit 130.

With reference to the station bearing comparator circuit, it will be seen that the cosine $\alpha$ signal input over path 178 is fed over resistance 220 to the inverting terminal of comparator circuit 222 (Fairchild 710). The non-inverting input of comparator 222 is connected over a reference circuit which includes a diode 224 connected in series with a resistance 226 between ground and −12 volts. An adjustable resistor 228 is connected across diode 224 to provide a negative reference signal in the order of −0.1 volt over resistance 230 to the non-inverting input of comparator 222. Terminal 2 of comparator 222 is connected directly to ground, terminal 6 is connected over Zener diode 232 to ground, and over resistance 234 to −12 volts, and terminal 11 is connected to + 12volts.

If cosine $\alpha$ in the present example is less than +0.1 volts and is greater than −0.1 volt, it can be shown that the bearing to the station is 85°– 95°, and the signals fed to gate 204 over inputs 203, 203' will cause the output of gate 204 to be high. The signal output of gate 204 is applied over resistor 230 to the base of transistor 242, which is biased by negative potential fed over resistor 241. Whenever the output of gate 200 is low, and simultaneously the output of comparator 182 is low, then the output of logic element 204 is high and transistor 242 turns on and station bearing relay 248 will operate over a circuit which extends from +28 volts over the winding of relay 248 and transistor 242 to ground. Diode 246 is connected across the winding of relay 248 for transient protection purposes.

As station bearing relay 248 operates, it is effective at its contacts 0 to interrupt the application of the course error signal $\epsilon$ ($-\epsilon$), by conductors 68 and 72 to the non-inverting terminal of the operational amplifier 132, and at its contacts G connects ground to the non-inverting terminal whereby the output of the operational amplifier 132 at this time will be the $\alpha$ signal input over resistance 128 to the inverting terminal. When the output signal $X = \alpha$ and the pilot is turned toward a straight line route to the selected station, he responsively directs the aircraft toward the station, and the angle $\alpha$ will become less than 95° and the signal output of gate 204 will go low to turn transistor 242 off and restore relay 248. As relay 248 restores, contacts 0 are closed, and signal $\epsilon$, $-\epsilon$ is once more applied to the operational amplifier 132 to provide the left-right deviation signal $\epsilon - \alpha$ for flight along the selected azimuth.

It is noted that the output of gate 204 is also applied over resistor 252 to the base of transistor 254, which has its emitter connected to ground, and its collector connected over an indicator lamp 253 to +12 volts battery. Diode 256 is connected across the base-emitter circuit of transistor 254 for base-emitter transistor protection purposes.

Whenever the output of gate 204 is high (i.e., the bearing to the station is within the range of 85° to 95°), such signal is also fed over resistance 252 to the base of transistor 254 and transistor 254 is turned on.

As transistor 254 turns on, indicator lamp 253 will light to indicate to the pilot that the aircraft is in a position (i.e., a relative bearing of 85° – 95° to the station) in which the display flag should be ignored. The lamp 253 will of course be extinguished as the pilot initiates his turn toward (or away from) the selected station.

Over-Station Detection Circuit 184

As indicated above, the present system is also operative to ascertain whenever the aircraft is over the selected station or approaching very closely to such position. When such condition is detected, the left-right signal is disregarded, and the pilot must fly the compass until such time as the TO-FROM indication reappears.

Over-station detection circuit 184 has its input circuit connected to conductor 178 (over which it will be recalled a DC polarity signal representative of the cosine $\alpha$ is provided). The cosine $\alpha$ signal as input thereto is coupled over coupling capacitor 258 and resistance 260 to an operational amplifier 262 (Fairchild 741) which is connected as a differentiator circuit 264. An RC feedback circuit 267 is connected between the output terminal and the inverting terminal of the operational amplifier, and the non-inverting terminal of the operational amplifier is connected over resistance 266 to ground.

The signal output of the differentiator circuit 264 is determined by the rate of change of the cosine $\alpha$ signal. That is, whenever the aircraft is closer to the station the value of cosine $\alpha$ will change at a more rapid rate than when the aircraft is more distant from the station. The value of the signal output from the differentiator circuit 264 will vary with the rate of change of the value of the cosine $\alpha$ signal. Such output signal is fed to a limiter circuit 270 which includes an operational amplifier 272 (Fairchild 741) having its inverting input connected to the output of differentiator 264, and its non-inverting terminal connected to the junction of a pair of oppositely poled diodes 276, 278. Such diodes are operative whenever the output signal of differentiator 264 exceeds a preset value, and thereby protects the remaining circuits in the stage. The signal output of the limiter circuit 270, and operational amplifier 272 is connected over resistance 274 to its inverting input terminal input. The inverting input of amplifier 272 is also connected over resistor 280 to negative 12 volts.

The signal output of limiter 270 is fed over an RC filter circuit 282, 284 to the base of a Darlington connected emitter-follower 288, the collectors and emitter of which are respectively connected to + 12 volts and over resistor 290 to − 12 volts. Transistor 288 operates as a buffer stage, the output of which is fed over resistor 292 to the inverting input of a comparator circuit 291. The non-inverting input of comparator circuit 291 is connected over resistor 296 to the junction of a voltage divider 298, 299 which is connected between + 12 volts and ground. The output of comparator circuit 294 is fed over resistor 300 to the non-inverting input terminal thereof.

Whenever the aircraft is over a station, and the signal changes sufficiently rapidly, the differentiator 264 will provide a signal of a value over limiter 270 and filter circuit 283 which is sufficient as compared to the reference signal input to the non-inverting terminal of comparator 294 to cause the comparator output to go low, and thereby turn off the normally conducting transistor 310. In the absence of a signal indicating the presence of the aircraft over a station, the output of comparator 294 (by reason of the positive feedback over resistor 300) will be high, and accordingly such signal as fed over resistor 302 will bias transistor 310 to be normally conductive.

Therefore, when the aircraft is not over the station, transistor 310 will conduct and a circuit will be completed from +28 volts over relay 315 and transistor 310 to ground. With relay 315 operated, contacts 317 will be closed and either a −3 volt or +3 volt signal (depening on whether a TO or FROM condition exists) is fed over contacts 317 to the flag display 215.

As the aircraft moves over the station or approaches the station, the signal output of comparator 294 goes low and transistor 310 is cut off. Relay 315 is therefore restored and at its contacts 316 will connect ground over conductor 212 to the flag display 215, whereby the flag moves to the center position to indicate to the pilot that the aircraft is over the station.

When the aircraft moves in a direction from the station, the rate of change of the cosine $\alpha$ signal will decrease, and the output of comparator circuit 291 will go high to turn on transistor 310, and operate relay 315 to reconnect the TO-FROM indicator circuit (contacts F, T) to the flag display unit 215.

I claim:

1. In an ADF system for providing azimuth steering information for an aircraft comprising an automatic direction finder receiver having means for selecting a desired broadcast station, and output means for providing a signal $\alpha$ which is proportional to the relative bearing to the selected broadcast station, means for deriving a signal sin $\alpha$ therefrom, course selector means for selecting a desired course line to the station, means providing a signal $\epsilon$ having a value which represents the course error of the aircraft to the selected station, and difference means responsive to the difference of said signals sin $\alpha$ and $\epsilon$ to provide an output signal X which represents the deviation of the aircraft from the selected course line to the broadcast station.

2. A navigational system as set forth in claim 1 which includes circuit means connected to said output means for providing a first signal whenever said aircraft is approaching the selected station and a second signal whenever said aircraft is going from the selected station.

3. In an ADF system for providing azimuth steering information for an aircraft comprising an automatic direction finder receiver having means for selecting a desired broadcast station, and output means for providing a signal $\alpha$ which is proportional to the relative bearing to the selected broadcast station, means for deriving a signal sin $\alpha$ therefrom, course selector means for selecting a desired course line to the station, means providing a signal $\epsilon$ having a value which represents the course error of the aircraft to the selected station, difference means responsive to the difference of said signals sin $\alpha$ and $\epsilon$ to provide an output signal X which represents the deviation of the aircraft from the selected course line to the broadcast station, and circuit means connected to said output means including derivation means for deriving a cosine $\alpha$ signal having an amplitude and polarity which indicates the angle of the relative bearing of the station for use in detecting the TO-FROM condition of said aircraft relative to the selected station, and detection means responsive to said cosine $\alpha$ signal to at times indicate the detection of a TO condition, and at other times to indicate the detection of a FROM condition.

4. In an ADF system for providing azimuth steering information for an aircraft comprising an automatic direction finder receiver having means for selecting a desired broadcast station, and output means for providing a signal $\alpha$ which is proportional to the relative bearing to the selected broadcast station, means for deriving a signal sin $\alpha$ therefrom, course selector means for selecting a desired course line to the station, means providing a signal $\epsilon$ having a value which represents the course error of the aircraft to the selected station, difference means responsive to the difference of said signals sin $\alpha$ and $\epsilon$ to provide an output signal X which represents the deviation of the aircraft from the selected course line to the broadcast station, and circuit means connected to said output means for providing an output signal whenever the relation bearing to the station from said aircraft is in a predetermined angular range.

5. A navigational system as set forth in claim 4 in which said circuit means includes blocking means responsive to said output signal to block the input of said signal $\epsilon$ to said summing difference means for the period that such signal occurs.

6. A navigational system as set forth in claim 4 in which said circuit means includes cosine $\alpha$ derivation means connected to said output means, including means for providing a DC polarity signal which represents the value of cosine $\alpha$, reference means for establishing the values of cosine $\alpha$ whenever the extremes of said range occur, and means for comparing the polarity and value of said DC signal with the values established by said reference means.

7. In an ADF system for providing azimuth steering information for an An aircraft comprising an automatic direction finder receiver having means for selecting a desired broadcast station, and output means for providing a signal $\alpha$ which is proportional to the relative bearing to the selected broadcast station, means for deriving a signal sin $\alpha$ therefrom, course selector means for selecting a desired course line to the station, means providing a signal $\epsilon$ having a value which represents the course error of the aircraft to the selected station, difference means responsive to the difference of said signals sin $\alpha$ and $\epsilon$ to provide an output signal X which represents the deviation of the aircraft from the selected course line to the broadcast station, and overstation circuit means connected to said output means for providing an output signal in response to an overstation condition.

8. A navigational system as set forth in claim 7 which includes visual display means for indicating an overstation condition, and means for connecting said output signal to operate said visual display means whenever said over-station condition occurs.

9. A navigational system as set forth in claim 8 in which said over-station means includes derivation means connected to said output means for providing a cosine $\alpha$ signal, means including a differentiator circuit for detecting a change of said cosine signal at a given rate, and control means responsive to detection of said change by said differentiator circuit for providing a control signal to indicate an over-the-station condition.

10. A system as set forth in claim 9 which includes visual display means for indicating an over-station condition, further means responsive to said cosine $\alpha$ signal to provide signals indicating TO-FROM conditions of said aircraft, means display said signals over a circuit to said visual display means, and switching means controlled by said control signal to interrupt such circuit whenever said aircraft is over the selected station.

11. In an ADF navigational system for providing azimuth steering information comprising an automatic direction finder receiver (ADF) having means for selecting the desired broadcast station, and means for providing an output signal which is proportional to the relative bearing of the station, signal derivation means responsive to said output signal $\alpha$ to derive a sin $\alpha$ signal and a cosine $\alpha$ signal, means for selecting a desired course to said station and means for providing a signal $\epsilon$ proportional to the course error, difference means for differencing said sine $\alpha$ signal and said $\epsilon$ signal to provide the deviation signal X and selection means controlled by said cosine $\alpha$ signal for selectively connecting said signal $\epsilon$ to said difference means.

12. A navigational system as set forth in claim 11 which includes detection means responsive to said cosine $\alpha$ signal to determine whether the relative bearing represents an acute or obtuse angle, means for providing a $-\epsilon$ signal, and means controlled by said detection means for selectively connecting said $\epsilon$ and $-\epsilon$ signal to said difference means.

13. A navigational system as set forth in claim 11 in which said output signal $\alpha$ comprises an AC signal having an amplitude which is determined by the value of the relative angle and a phase determined by the relative bearing sector in which the station is located.

14. A navigational system as set forth in claim 13 which includes phase detection means responsive to said sine signal to provide a DC polarity signal for coupling to said difference means to represent the relative bearing of the station.

15. A method of deriving azimuth steering commands for an aircraft to a selected course of a standard radio broadcast station which comprises the steps of deriving sine $\alpha$ and cosine $\alpha$ signals from an ADF receiver which represents the relative bearing $\alpha$ to a selected broadcast station, deriving a signal $\omega$ which has a value which represents the magnetic heading of the aircraft, providing a signal $\nu$ which represents a selected course line to the broadcast station, subtracting said signal $\omega$ from said signal $\nu$ to provide a course error signal $\epsilon$, and differencing said course error signal $\epsilon$ and said sine signal $\alpha$ to provide a deviation signal X and deriving a blocking signal for said course error signal $\epsilon$ whenever said cos $\alpha$ signal has a predetermined value.

16. A method of deriving azimuth steering commands for an aircraft to a selected course of a standard radio broadcast station which comprises the steps of deriving a sin $\alpha$ and a cosine $\alpha$ signal from an ADF receiver which represents the relative bearing $\alpha$ to a selected broadcast station, providing a course error signal $\epsilon$, differencing said course error signal $\epsilon$ and said sin $\alpha$ signal to provide a deviation signal X, and deriving a blocking signal for said course error signal $\epsilon$ whenever said cos $\alpha$ signal has a predetermined value.

17. The method of claim 16 which includes the further steps of deriving the TO-FROM condition of said aircraft from said cosine $\alpha$ signal and providing a visual indicator of such condition as detected.

18. The method of claim 16 which includes the further steps of differentiating said cosine $\alpha$ signal, and providing an over-the-station indication whenever said cosine $\alpha$ signal changes at greater than a given rate.

* * * * *

UNITED STATES PATENT OFFICE
CERTIFICATE OF CORRECTION

Patent No. 3,787,809        Dated January 22, 1974

Inventor(s) Philip G. Cooper

It is certified that error appears in the above-identified patent and that said Letters Patent are hereby corrected as shown below:

Column 14, line 26, "relation" should be -- relative --;

line 31, "summing" should be deleted;

line 43, "An" should be deleted;

Column 15, line 9, "display" should be deleted, and

-- connecting -- inserted in lieu thereof.

Signed and sealed this 23rd day of July 1974.

(SEAL)
Attest:

McCOY M. GIBSON, JR.
Attesting Officer

C. MARSHALL DANN
Commissioner of Patents